United States Patent [19]
Kuwahara et al.

[11] Patent Number: 6,141,335
[45] Date of Patent: Oct. 31, 2000

[54] RADIO COMMUNICATION SYSTEM

[75] Inventors: Mikio Kuwahara, Menlo Park, Calif.;
Seishi Hanaoka, Yokohama, Japan;
Nobukazu Doi, Hachioji, Japan;
Takaki Uta, Yokohama, Japan

[73] Assignee: Hitachi, Ltd., Tokyo, Japan

[21] Appl. No.: 08/985,484

[22] Filed: Dec. 4, 1997

[30] Foreign Application Priority Data

Dec. 6, 1996 [JP] Japan .................................. 8-326494

[51] Int. Cl.[7] .......................... H04B 7/216; H04B 1/034
[52] U.S. Cl. ........................................... 370/342; 455/513
[58] Field of Search .................................... 370/328, 324, 370/331, 342; 455/442, 509, 513, 524, 562; 342/428, 449, 457

[56] References Cited

U.S. PATENT DOCUMENTS

| | | | |
|---|---|---|---|
| 5,491,833 | 2/1996 | Hamabe ................................. | 455/33.1 |
| 5,606,727 | 2/1997 | Ueda ..................................... | 455/34.1 |
| 5,666,123 | 9/1997 | Chrystie ................................ | 342/373 |
| 5,697,066 | 12/1997 | Acampora ............................. | 455/54.1 |
| 5,805,996 | 9/1998 | Samela .................................. | 455/453 |
| 5,819,182 | 10/1998 | Gardner et al. ........................ | 524/275 |
| 5,859,612 | 1/1999 | Gilhousen ............................. | 342/457 |
| 5,890,067 | 3/1999 | Chang et al. .......................... | 455/446 |

OTHER PUBLICATIONS

Miura, Tanaka, Horte and Karasawa, *A Study on Maximal–Ratio Combining of Mulipath Signals* . . . , ATR Optical and Radio Communications Research Laboratories, 1995.

*Primary Examiner*—Alpus H. Hsu
*Assistant Examiner*—Duc Ho
*Attorney, Agent, or Firm*—Sofer & Haroun, LLP

[57] ABSTRACT

In a cellular radio communication system including a plurality of base stations and a plurality of terminals in which one cell is divided into a plurality of sectors, each of the base stations transmits and receives control information by an omnidirectional beam and transmits and receives traffic information by a directional beam. Alternatively, each of the base stations transmits and receives control information by a directional beam with a time difference of the same control information in a plurality of sectors within one cell and transmits and receives traffic information by a directional beam.

3 Claims, 12 Drawing Sheets

RADIO COMMUNICATION SYSTEM

BACKGROUND OF THE INVENTION

1. Field of the Invention

The present invention relates a cellular radio communication system such as a portable telephone and a mobile telephone, and particularly to a transmission method of control channel information. More particularly, this invention relates to a radio communication system using a code division multiple access (CDMA) system.

2. Description of the Related Art

In the cellular radio communication system, there have hitherto been proposed methods of increasing a subscriber's capacity. A fixed sector system is known as one of such proposed methods. FIG. 1 schematically shows a method of transmitting radio waves in a radio communication system of a fixed sector system.

According to the fixed sector system, a cell is divided into several sectors by a plurality of antennas each having a directional antenna pattern, thereby decreasing an interference to other sector, thus to increase a subscriber's capacity. FIG. 1 shows an example of the manner in which three sectors comprise one sector, i.e. antennas 17a, 17b, 17c each having a fixed directional antenna pattern divide a cell 19 to provide sectors 22, 23, 24.

There will be described the manner in which a cell is divided into sectors in a code division multiple access (CDMA) system that recently receives a remarkable attention as a radio communication multiple access system. When the cell of the CDMA system is divided into sectors, a pilot signal, which is assigned a different phase of spreading code for every sector, is transmitted. Thus, a terminal is able to recognize sectors as different base stations.

In the United States of America, there is known the TIA/EIA/IS-95-A as the standards of the cellular radio communication system of the DS/CDMA (Direct Sequence/Code Division Multiple Access) system. On the other hand, in Japan, the cellular radio system of the CDMA system has been considered by the Association of Radio Industries and Businesses (ARIB).

However, when a cell is divided into sectors, there is then presented the following problems:

The terminal searches other connection channel even during a communication by a so-called cell-search which is a procedure for establishing a synchronization between the terminal and the base station and searching the nearest cell. If the terminal discovers a nominated connection channel which satisfies a predetermined threshold value, then the terminal issues a traffic channel switching request (handoff request) for a different sector or a different cell to the base station. When the cell is divided into the sectors, it is unavoidable that an amount of handoff to be processed between the sectors or the cells increases.

In order to support a softer handoff which is a seamless handoff between the sectors, upon switching, one terminal has to be connected to two sectors, i.e. two base stations simultaneously. However, when two sectors are connected to one terminal at the same time, the terminal transmits and receives control information between the antennas of the two sectors, thereby unavoidably increasing power radiation on the whole. Moreover, upon handoff, auxiliary channels have to be prepared in order to prevent a communication between the sector and the terminal from being disconnected. Thus, when the number of sectors increases, even if the number of sectors is increased, a subscriber's capacity does not increase in proportion to the increase of the number of the sectors.

As a system in which the above-mentioned fixed sector system is further developed and in which there are provided a number of sectors in which a directivity of an antenna is partly overlapped, there has been proposed an adaptive array antenna in which an antenna pattern can be controlled freely and in which an interference from other station can be minimized. This adaptive array antenna was disclosed at the 1995 Society Meeting SB-1-3 of the Institute of Electronics, Information and Communication Engineers. The array antenna is able to decrease an interference by changing a directional beam relative to radio communication terminals located in a variety of directions. Also in the array antenna, a digital beam forming (DBF) which is a beam space expansion is the most effective method because it is easy to control and the digital beam forming is developed owing to the innovation of a digital circuit technology.

In the fixed sector system, there exists a region in which an antenna gain is lowered at the boundary area between the sectors. FIG. 2 illustrates such a situation. As shown in FIG. 2, a base station 20 transmits a control signal by a directional antenna (see sectors 55, 56, 57). When the terminals are located at the boundary area between the sectors, the lowered antenna gain has to be compensated by power control. A control signal, which is generally represented by a pilot signal, needs a large transmit power because it has to be transmitted up to the boundary area of the cell. Unavoidably, this transmit power has to be increased much more.

On the other hand, it is difficult for the system using the array antenna to simultaneously transmit common information such as control channel information to terminals within a cell (sector). The reason for this is as follows. Since there exist a number of antenna elements, conversely, it is difficult to transmit radio waves by an omnidirectional antenna. Therefore, a method of effectively transmitting common information such as control channel information raises a serious problem.

Furthermore, since the pilot signal, which is required by the CDMA system, occupies a large ratio in down-link transmit power, if this mean power is reduced, then it is possible to increase a subscriber's capacity considerably.

SUMMARY OF THE INVENTION

An object of the present invention is to execute a processing required when a terminal moves between sectors by a smaller overhead.

Another object of the present invention is to more efficiently transmit a control signal such as a pilot signal.

These objects can be attained by the following system.

According to the present invention, there is provided a radio communication system which comprises a plurality of base stations and a plurality of mobile terminals. The base station includes an antenna group composed of a plurality of antennas, a beam generating unit for generating arbitrary directional beams by applying a phase rotation to terminals of the antenna group, a traffic channel transmitting and receiving unit connected to a network for modulating and demodulating communication information, a beam selecting unit for combining a signal generated by the traffic channel transmitting and receiving unit and a transmitted direction and a base station control unit for controlling the traffic channel transmitting and receiving unit and the beam selecting unit. The beam selecting unit receives a signal transmitted from a certain radio communication terminal by a plurality of beams, selects a beam having the strongest received power or a beam having an excellent communication quality from the received beams or improves a signal quality by combining a plurality of beams and receives such signal having an excellent signal quality. Upon transmission, the beam selecting unit selects a beam having the strongest received power in reception or a beam having an excellent communication quality and then transmits radio waves.

Herein, the directional beam is arranged so as to overlap the adjacent beams, and control information such as a pilot signal, broadcast information, call connection information or paging information is transmitted from or received from the base station by omnidirectional beams.

Alternatively, the base station transmits or receives call connection information, broadcast information, paging information and a pilot signal used in synchronization by different directional beams or the same directional antenna, and further transmits and receives the same information by the adjacent directional beam after a constant time elapsed, whereby an information beam is switched in such a manner that the same information may rotate in a clockwise or counter-clockwise direction when the base station equipment is seen from above.

According to the present invention, a softer handoff within the same cell does not occur so that a channel need not be doubled, thereby making it possible to increase a subscriber's capacity.

Further, according to the present invention, in a radio communication system using an array antenna, a directivity ripple of a control channel need not be compensated, and hence a ratio at which a control channel occupies a transmit power of a base station can be reduced. Furthermore, an interference of a pilot signal between the adjacent cells can be suppressed to the minimum, and hence a subscriber's capacity can be increased.

DESCRIPTION OF THE PREFERRED EMBODIMENTS

I. First Embodiment

A first embodiment in which the present invention is applied to a CDMA mobile communication system, in particular, the TIA/EIA/IS-95-A which is the standard of the cellular radio communication system in the United States of America will be described hereinafter.

Figure 1:
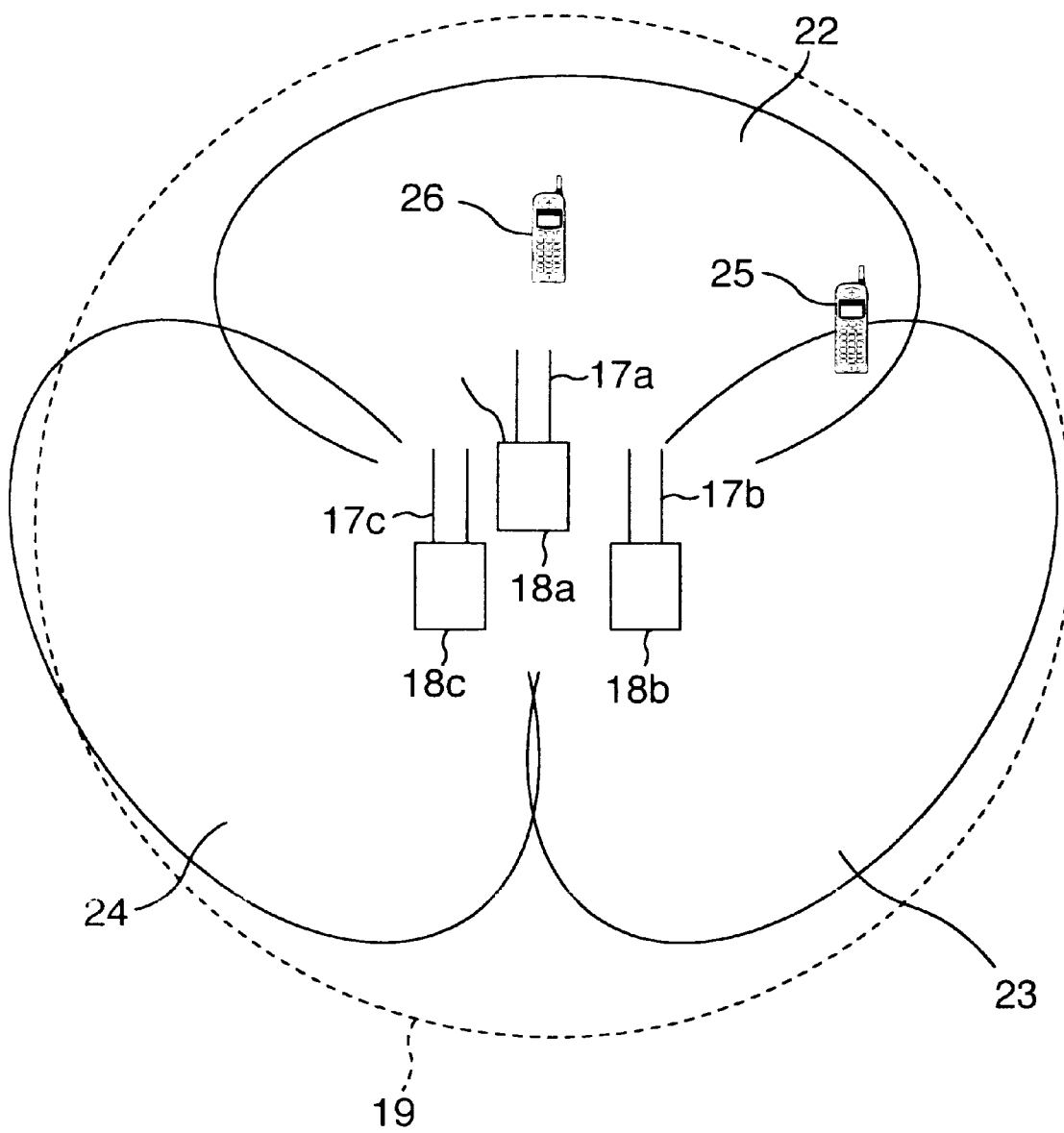
FIG. 1 is a schematic diagram used to explain a three-sector type radio communication base station according to the prior art.
Figure 2:
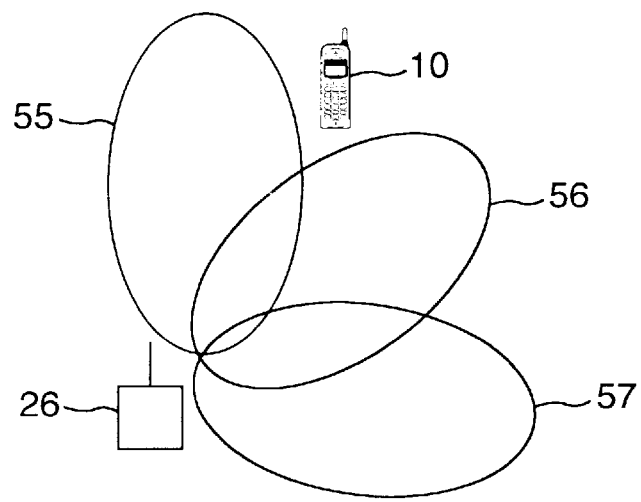
FIG. 2 is a schematic diagram showing an example in which control channel information and traffic channel information are transmitted by the same directional antenna according to the prior art.
Figure 3:
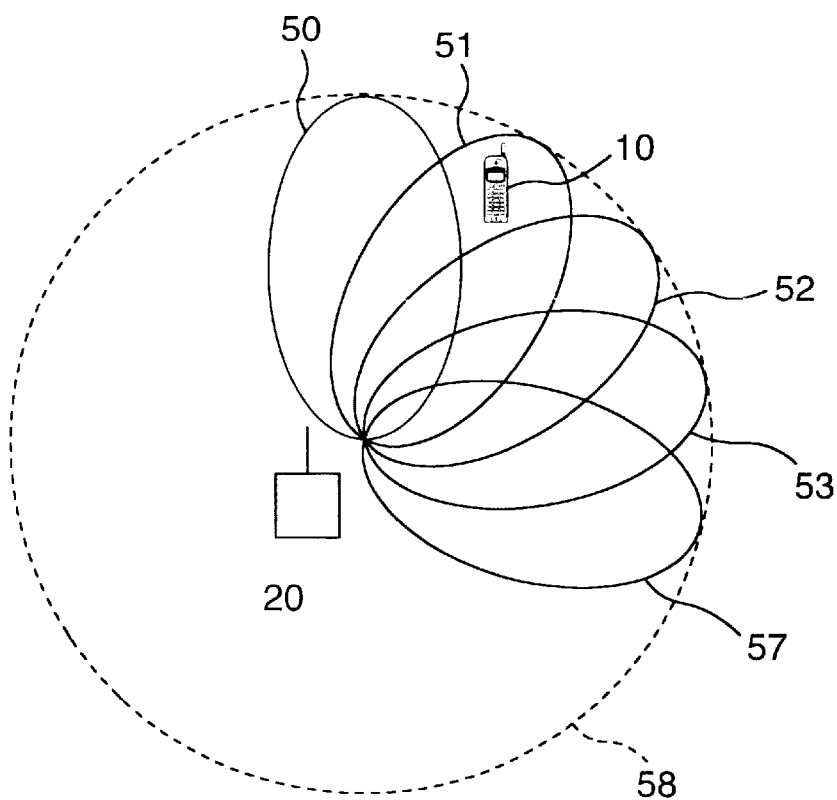
FIG. 3 is a directivity diagram of an antenna showing an example of a multi-directivity beam traffic channel realized by omnidirectional control channel and array antenna according to the present invention.

FIG. 3 is a directivity diagram of an antenna according to the present invention. In this embodiment, a control channel differs from a traffic channel in antenna directivity pattern for transmission and reception. In FIG. 3, reference numerals 50 to 54 denote traffic channel beams which are transmitted with a directivity to follow terminals. Reference numeral 58 denotes an omnidirectional control channel beam. Therefore, according to this embodiment, unlike the conventional fixed sector system, the control channel is transmitted by the omnidirectional beam so that a terminal 10 seems to communicate with one base station 20. Accordingly, even when a terminal moves in the circumference direction about a base station, a base station with which a terminal is communicated is not changed. If there is provided one base station, then control information which is generated when handing-off is not transmitted and received between the base stations. On the other hand, although the base station receives a traffic channel from a terminal by a plurality of directivity antennas for traffic channel, the base station is able to understand by examining an electric field strength of the traffic channel the position at which the terminal is located and the direction in which the terminal is moved. Therefore, the base station may continue the traffic channel by transmitting the traffic channel to the decided direction even though the terminal moves among the sectors.

Figure 4:
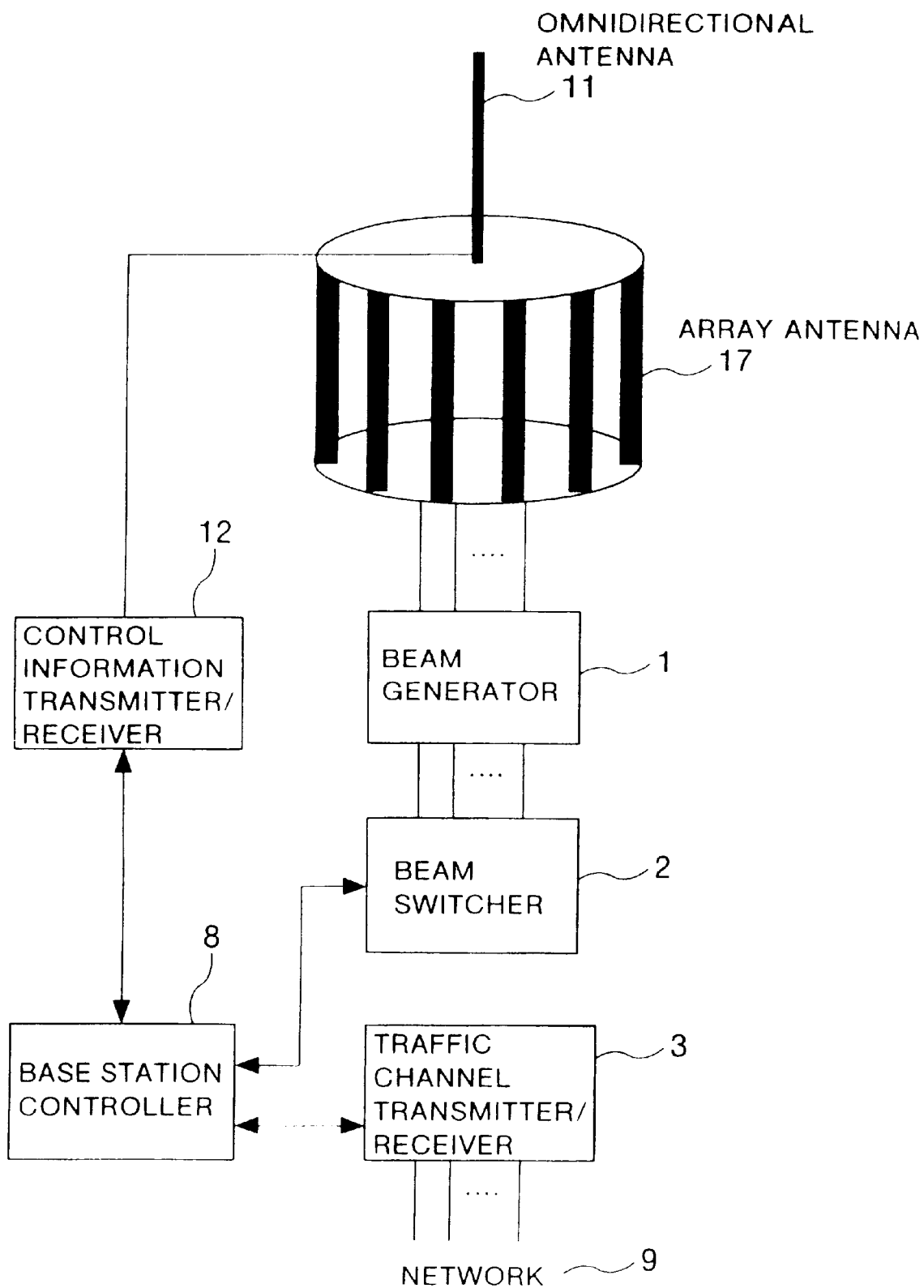
FIG. 4 is a block diagram showing a base station of a radio communication system according to the present invention.

FIG. 4 is a block diagram showing an example of a radio communication base station which enables the transmission pattern shown in FIG. 3 to be realized.

As shown in FIG. 4, this base station includes an array antenna 17 for traffic channel and an omnidirectional antenna 11 for control channel. A traffic channel transmitter and receiver 3 connects with a network 9 to transmit information to the network 9 or to receive information from the network 9. A base station controller 8 is connected to the traffic channel transmitter and receiver 3, a beam switcher 2 and a beam generator 1. The base station controller 8 divides information received from the network 9 through the traffic channel transmitter and receiver 3 to provide control channel information and traffic channel information and transmits the control channel information to a control information transmitter and receiver 12 and transmits the traffic channel information to the beam switcher 2. The control channel information is spread and modulated by the control information transmitter and receiver 12 and then transmitted via the omnidirectonal antenna 11. A traffic channel is assigned to the traffic channel information by the beam switcher 2, and further the direction of a directional beam is selected. The directivity beam and the traffic channel are connected under control of the base station controller 8. Further, the traffic channel information is spread, modulated and multiplied with other traffic channel information by the beam generator 1 and then transmitted via the array antenna 17. Up-link/down-link channels and their antenna direction are controlled by base station controller 8 and further transmitted through the traffic channel transmitter and receiver 3 to the network 9.

Although terminals are located in various directions within the cell, the base station controller 8 searches a beam having a largest electric field strength of traffic channel transmitted by a terminal during communication and commands the beam switcher 8 so as to select the searched beam or so as to combine signals received by a plurality of arbitrary beams, thereby realizing an up-link traffic channel in which an interference of other station is suppressed.

Upon transmission, if a down-link traffic channel is realized by selecting a directivity beam received at the largest electric field strength upon reception, then it is possible to carry out a communication in which a power can be prevented from being transmitted to a useless direction.

II. Second Embodiment

A second embodiment in which the present invention is applied to a CDMA mobile communication system, in particular, the TIA/EIA/IS-95-A will be described below.

In this embodiment, both of traffic channel information and control channel information are transmitted by directivity beams. Control channel information, however, is transmitted with a phase difference (time difference) generated at every sector, whereby an interference in an array antenna can be avoided and a ripple of a directivity pattern can be avoided.

Figure 5:
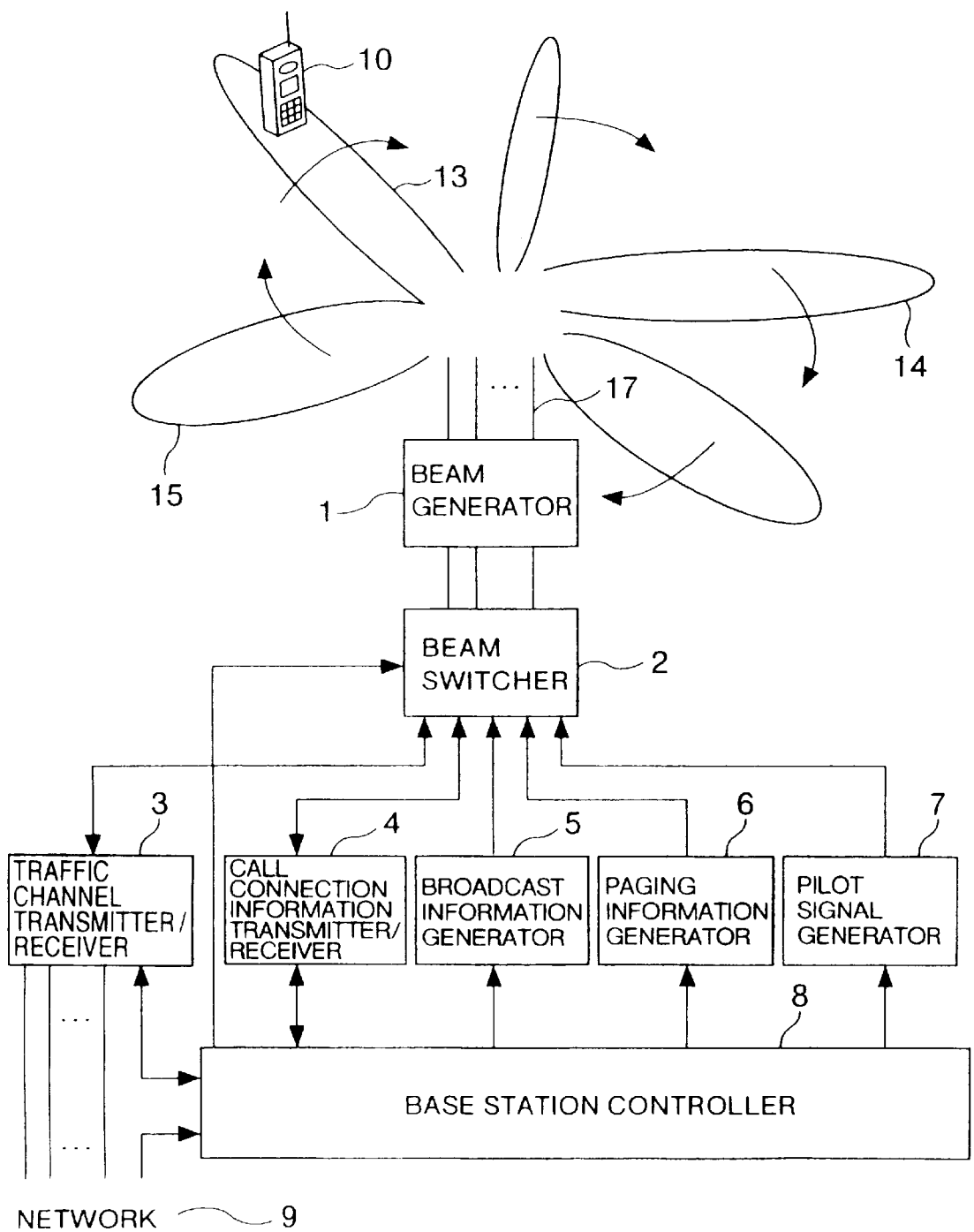
FIG. 5 is a partly-perspective block diagram showing a base station of a radio communication system according to the present invention.

FIG. 5 is a partly-perspective block diagram showing a radio communication system according to the second embodiment of the present invention. In FIG. 5, elements and parts identical to those of FIG. 4 are marked with the same references.

As shown in FIG. 5, there are provided a plurality of antennas 17 comprising an array antenna.

In the beam generator 1, a directional beam and its output are associated in a one-to-one relation by a suitable method such as a digital beam forming (DBF) method.

The beam switcher 2 associates information signals generated by various information generating apparatus 4 to 7 with a beam.

The traffic channel transmitter and receiver 3 transmits or receives a communication signal thereby to make an interface with the network 9. This channel signal corresponds to each terminal, and controls a directivity beam in such a manner that the directional beam may follow the mobile terminal. The control of the beam is carried out by the base station controller 8 based on the reception level of the communication signal.

A call connection information transmitter and receiver 4 is a block which generates and manages connection management information of a radio zone. While a terminal makes an outgoing call, the terminal transmits a call connection request to the base station, a terminator on the base station side of present information is the call connection information transmitter and receiver 4. The call connection request received at the call connection information transmitter and receiver 4 judges a radio channel situation of the base station, wire channel information for the network 9 and the state of the base station. The call connection information transmitter/receiver transmits channel assign message if channel assign is possible in response to the state of base station.

A broadcast information generator 5 is a block which generates information concerning management information and connection protocol such as transmission information of control channel and ID number of base station and which changes a format of broadcast information from the network 9 in such a manner that the format of broadcast information may be matched with a radio format.

A paging information generator 6 is a block which generates incoming call information which reports an incoming call to the terminal.

A pilot signal generator 7 is adapted to generate a pilot signal of the present base station. Channels relating to the elements 4 to 7 are called control channels for transmitting control information while the other channels are called traffic channels.

The contents and the formats of any of the pilot signal, the paging information, the broadcast information and the call connection information are standardized by the aforementioned TIA/EIA/IS-95-A.

The base station controller 8 controls the transmission of the control channel information as follows:

The base station controller 8 does not transmit the control channel information to all beams of a plurality of beams at the same time but transmits the control channel information to only a part of beams. After a constant time elapsed, the base station controller 8 changes the beams to the next beam, e.g. the adjacent beam to which the control channel information should be transmitted. If the base station controller 8 repeats this transmission process, the method in which the control channel information is transmitted is presented by a transmission method in which a beam rotates around the base station at every constant time interval like a lighthouse as shown in FIG. 6.

Figure 6:
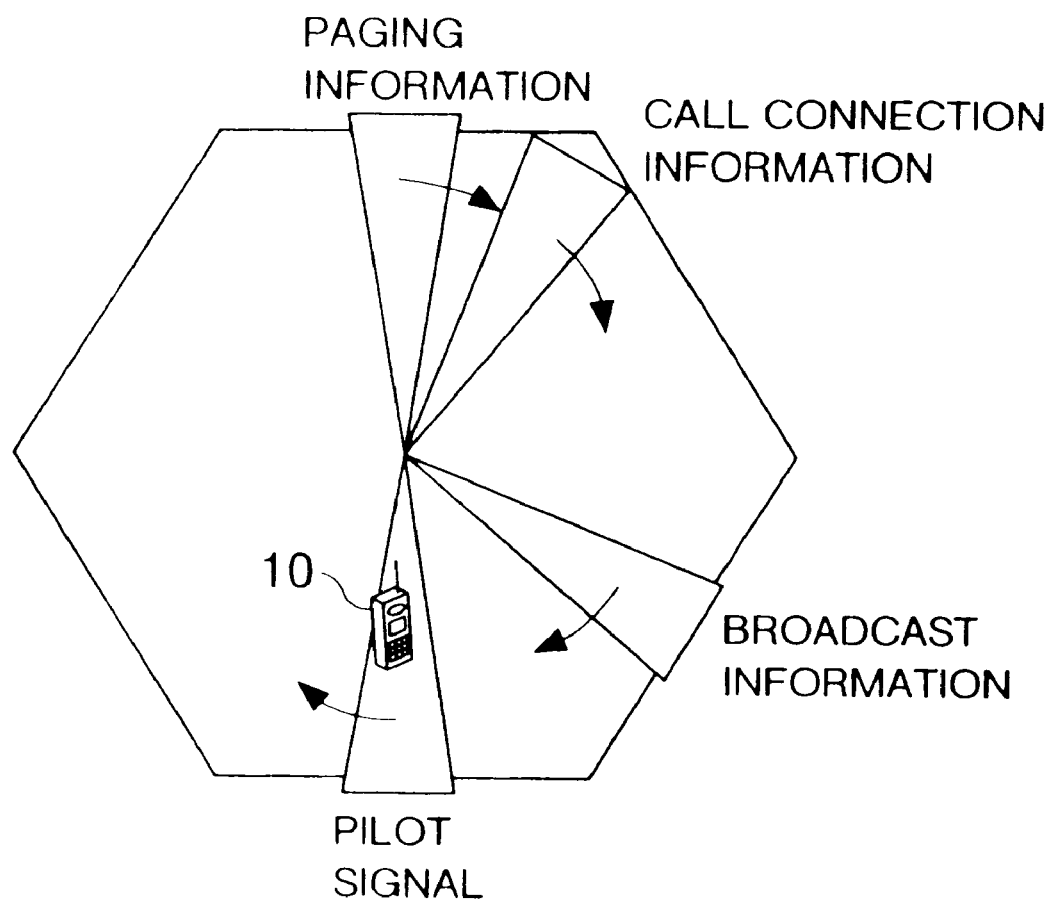
FIG. 6 is a diagram used to explain the manner in which a beam having each control information is rotated around a base station like a lighthouse according to the present invention.

When this process is seen from the terminal side, a terminal 10 which is now receiving the pilot signal in FIG. 6 does not receive control channel information any more during a constant time but receives broadcast information after a constant time elapsed. As described above, the control signals, such as the pilot signal, the broadcast information, the call connection information and the paging information are sequentially supplied to the terminal, and the terminal constantly receives such control signals repeatedly after a constant period of time elapsed. As a result, an interference of beams does not occur from a principle standpoint. In addition, it is sufficient for the terminal to obtain only necessary information in synchronism with the rotation cycle of this control information. There is then presented the advantage that a life span of batteries of a terminal receiver may be prolonged.

Figure 7:
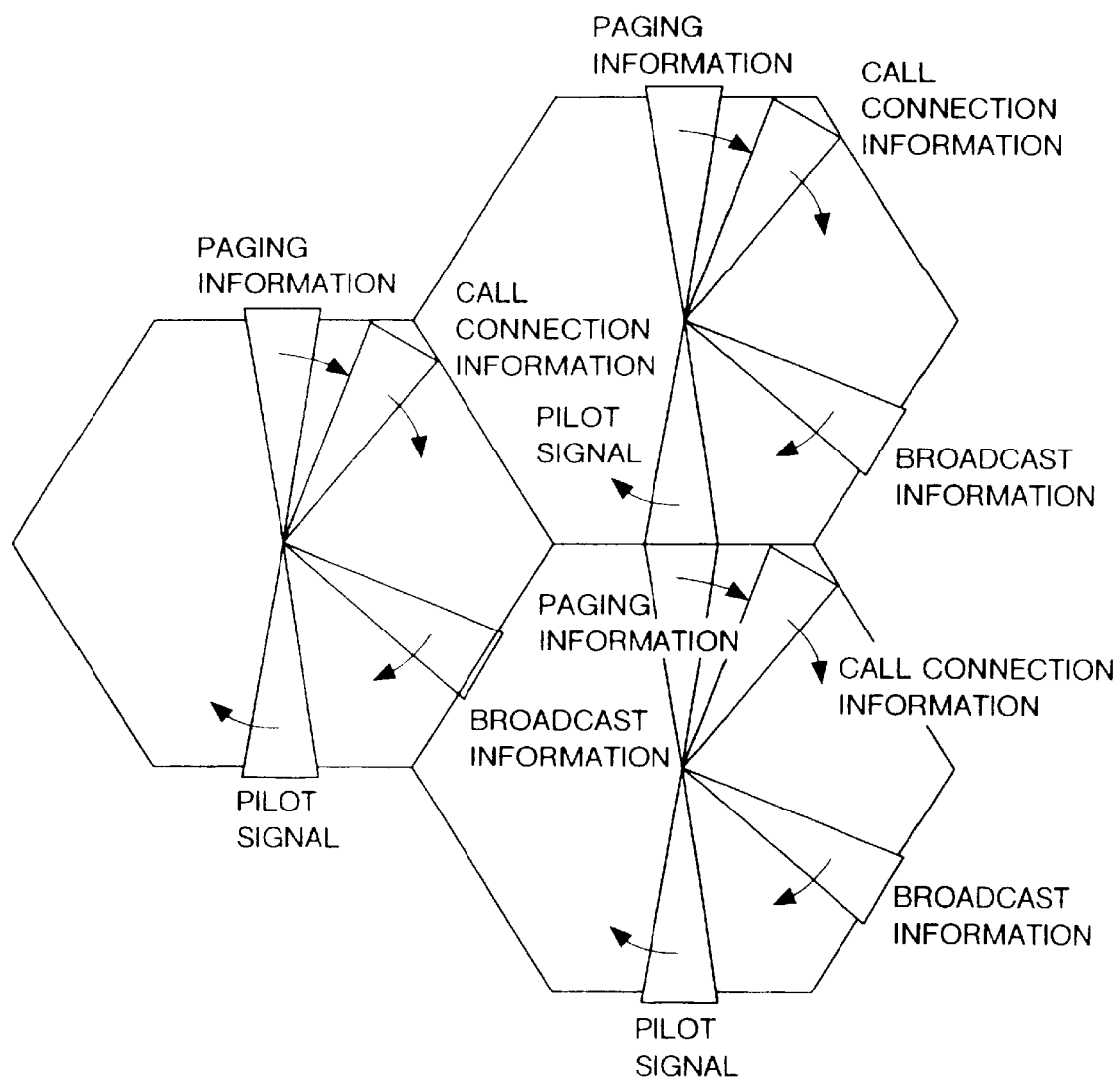
FIG. 7 is a diagram showing the manner in which a plurality of cells are adjoining to each other.

Further, in this embodiment, the pilot signal is transmitted intermittently but the direction in which the pilot signal is transmitted is changed successively. Let it now be assumed that there are disposed a plurality of adjacent cells as shown in FIG. 7. Then, a ratio of places in which intermittently-transmitted pilot signals interfere with each other is lowered and a probability in which the pilot signals from a plurality of adjacent cells will simultaneously be received at the terminal is considerably lowered so that an interference electric power of other cells can be reduced. In the base station system using the array antenna, since the traffic channel transmits radio waves only in the necessary direction, the interference electric power could be reduced. Furthermore, according to the embodiment of the present invention, an interference characteristic of the pilot signal which occupies a large ratio of the transmit power of the base station is improved, and hence a subscriber's capacity can be increased much more.

Although the pilot signal may be transmitted from a plurality of beams, in order to avoid an interference from the adjacent beam, it is effective to transmit the same pilot signal from beams of the number less than a half of the whole number of beams at maximum.

The timing at which the control signal is transmitted intermittently will be described with reference to FIG. 8. The control information, such as the pilot signal, the broadcast information, the call connection information and the paging information need not be rotated at the same cycle.

In the radio communication system of the CDMA system, the pilot signal is used as a synchronizing signal in the radio zone between the terminal and the base station. Therefore, in order to establish a synchronization by the pilot signal which is intermittently transmitted, the terminal has to operate by an internal clock while a signal is not received. Accordingly, if a time zone in which a signal is not transmitted is as short as possible, then it is possible to lower a required accuracy of synthesizers of the terminal and the base station. In a system in which a chip rate is 1 Mcps (chip per second) and the terminal allows a frequency variance of 0.1%, for example, if a synthesizer is a synthesizer of central frequency precision 1 ppm, it is necessary to supply a pilot signal at every 1 millisecond.

Also, it takes a lot of time for the terminal to capture a pilot signal thereby to establish a synchronization. Therefore, at a certain point, the pilot signal has to be continuously received more than a constant period of time.

Figure 8:
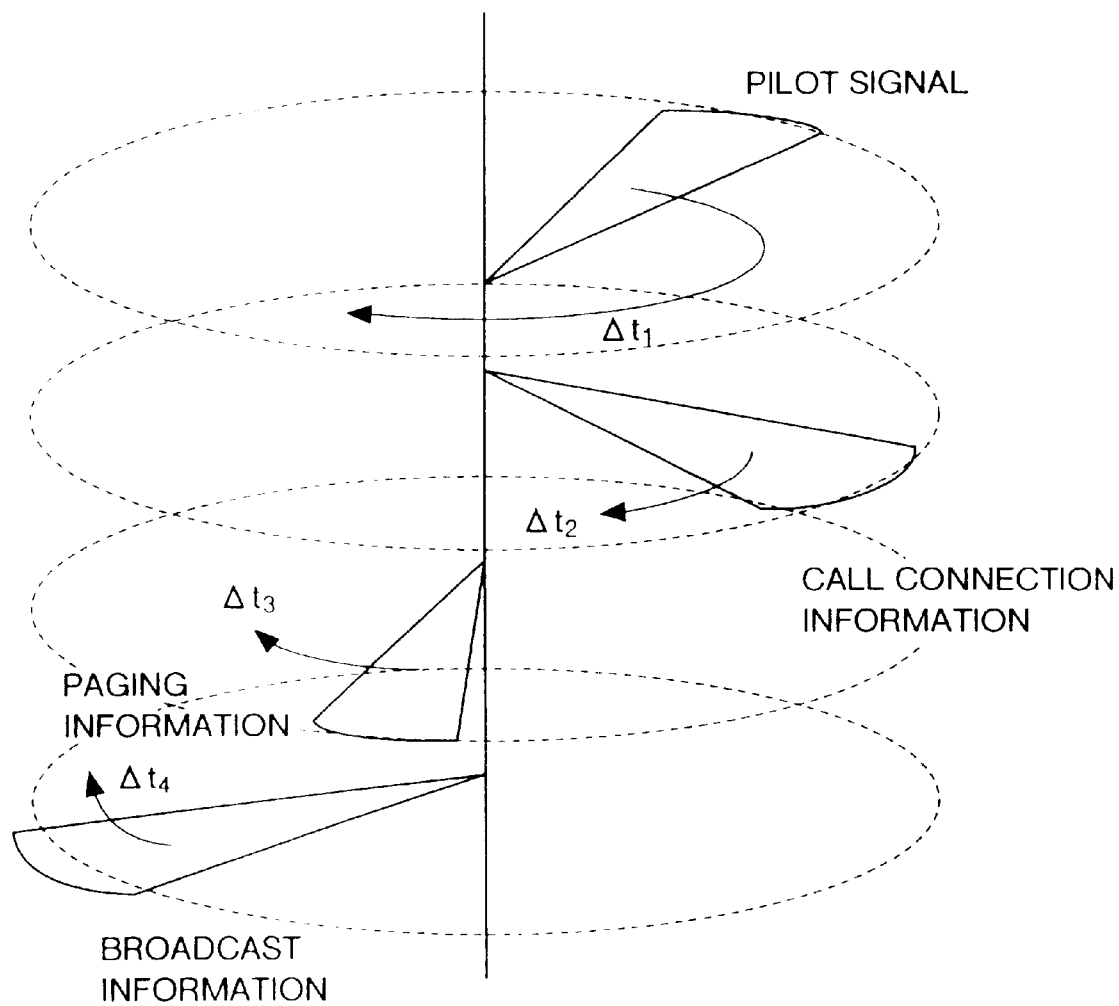
FIG. 8 is a conceptual diagram showing the transmission state of control channel information.

In FIG. 8, each information is moved to the next beam at a constant time $\Delta t n$. However, moving speeds of respective information elements are $\Delta t1$, $\Delta t2$, $\Delta t3$, $\Delta t4$ and moving speeds which are individually determined with respect to respective information elements. In this case, although there occurs a time in which respective signals are overlapped, in the CDMA system, respective signals can be discriminated from each other by individual spreading codes, thereby avoiding an interference.

The interval at which the above-mentioned control information is transmitted and the rotation speed are controlled by the base station controller 8.

On the other hand, the up-link control information from the terminal to the base station has to be transmitted during a period in which beams of corresponding down-link control information are oriented toward the terminal. The up-link control information is received at the array antenna 17. The beam switcher 2 improves a signal quality by selecting a beam having the strongest received power or a beam having an excellent communication quality or by combining a plurality of beams. As a method of combining beams, there are known the following methods:

(1) Maximal-ratio combining method using a correlation output value of each beam as a weight;

(2) CMA (Constant Modulus Algorithm);

(3) Equal gain combining method such as adding output values of respective beams as they are;

(4) RAKE combining method in which time delays are considered;

(5) Method of totaling three beams of a beam having a maximum amplitude and adjacent beams.

A synchronization of a spreading code in the CDMA system will be described next.

In the DS/CDMA system, a synchronizing accuracy of a spreading code largely affects an error rate of a radio path. To increase the rotation speed of the pilot signal and to substantially increase a frequency of pilot signals supplied to the terminal by transmitting pilot signals from a plurality of beams contribute to the improvement of the accuracy. However, when the terminal is energized or the terminal searches other connection destinations by a cell-search method during a communication, the terminal has to establish a synchronization from the state that a synchronization is not established between the base station and the terminal at all.

The DS/CDMA system spreads and modulates an original code O(t) by using both a short spreading code (short code) S(t) of a short period for effecting a primary spreading and a long spreading code (long code) L(t) of a long period for effecting a secondary spreading. Although the pilot signal may generally be spread in the form of O(t)S(t)L(t) and then transmitted, the pilot signal may be spread by the short spreading code only and then transmitted in the form of O(t)S(t). The latter form is referred to as "state that the long spreading code is masked". The state that the long spreading code is masked can be detected by the receiver and used to establish the synchronization between the base station and the terminal. Specifically, the pilot signal is divided into a portion $P_S$ in which the pilot signal is spread only by the short spreading code S(t) and a portion $P_B$ in which the pilot signal is spread by using both the short spreading code S(t) and the long spreading code L(t), and then the portion $P_S$ and the portion $P_B$ are transmitted one after another. Thus, the terminal can establish a synchronization with respect to only the short spreading code S(t) and reproduce a timing of a code with ease.

Figure 9A:
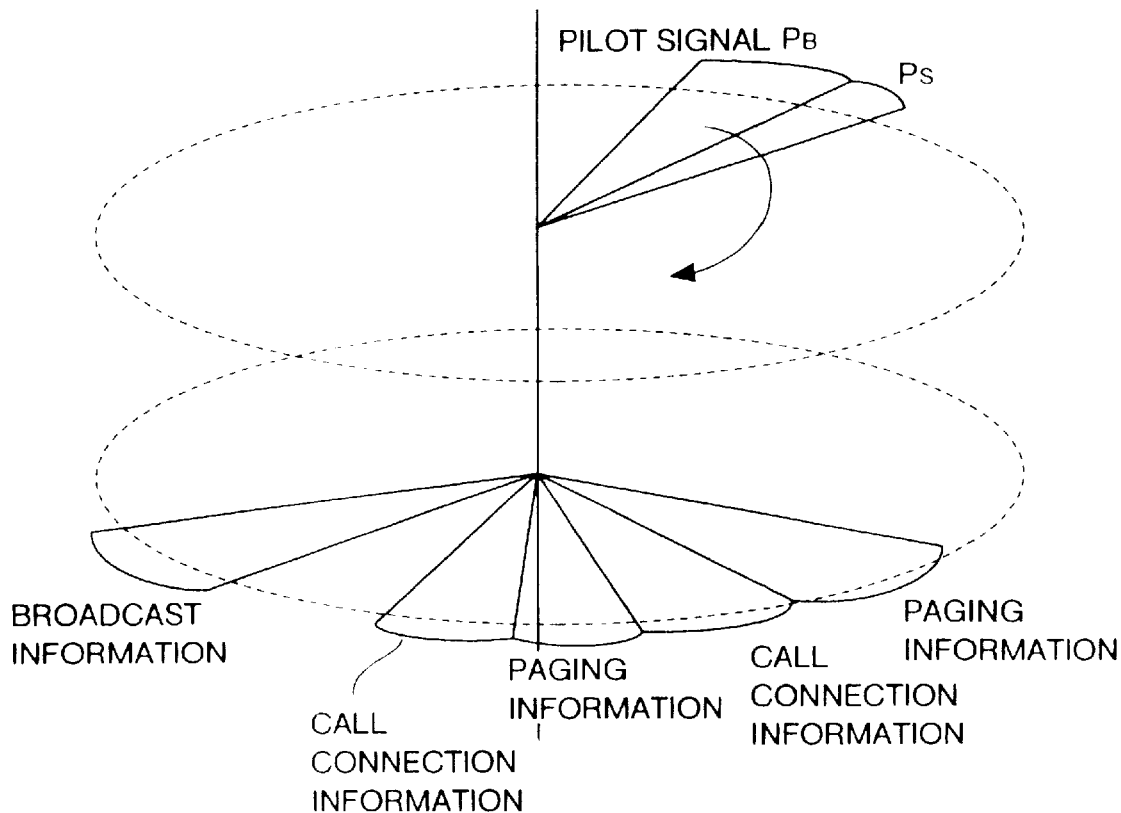
FIGS. 9A and 9B are respectively diagrams used to explain a directional beam and information transmitted by such directional beam.
Figure 9B:
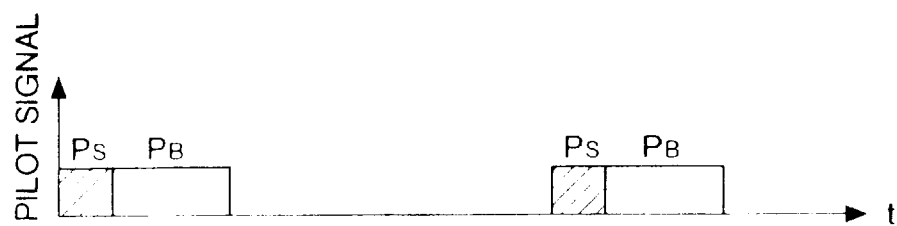
Figure 10A:
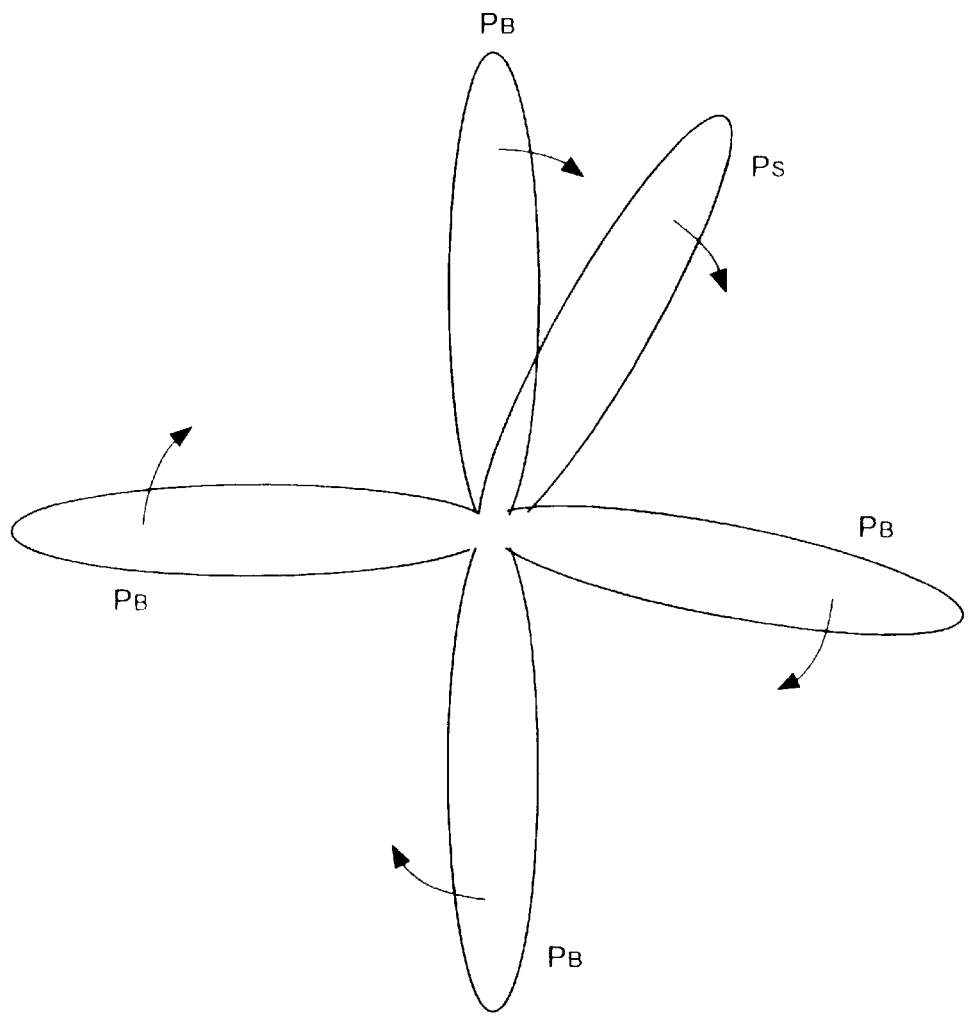
FIGS. 10A and 10B are respectively diagrams showing an example in which there are less beams masked than those of not masked when a plurality of pilot signals are transmitted simultaneously.
Figure 10B:
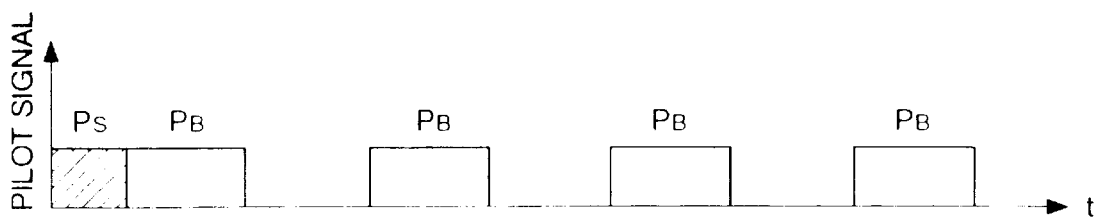

FIGS. 9A and 10A are diagrams showing the thus transmitted pilot signals by a beam position of a certain time. On the other hand, FIGS. 9B and 10B are diagrams showing a time transition of one beam.

While FIGS. 9A and 9B illustrate the example in which the number of the pilot signal $P_S$ in which the long spreading code is masked and the number of the pilot signal $P_B$ in which the long spreading code is not masked are set to a one-to-one relationship, it is sufficient that there is at least one pilot signal $P_S$ in which the long spreading code is masked in a beam group. As shown in FIGS. 10A and 10B, for example, if there are provided one pilot signal $P_S$ in which the long spreading code is masked and four pilot signals $P_B$ in which the long spreading code is not masked, then there can be achieved similar effects.

Figure 11:
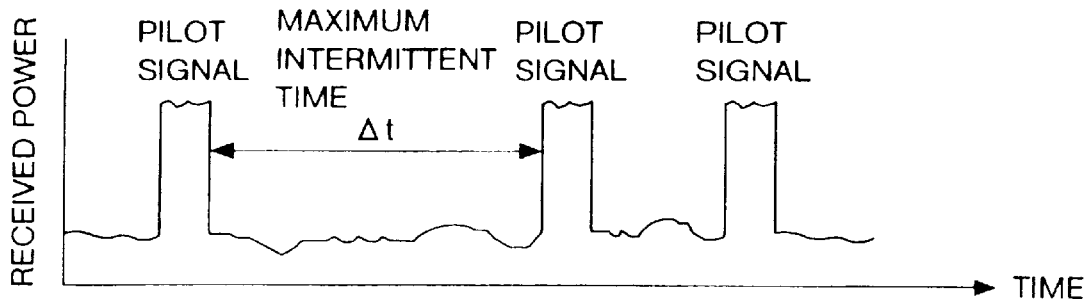
FIG. 11 is a diagram showing the received power presented when an intermittent time of a pilot signal is not constant.
Figure 12:
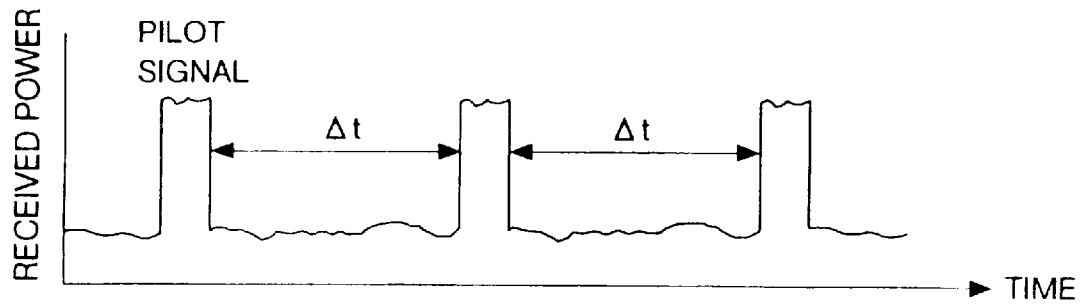
FIG. 12 is a diagram showing the received power presented when an intermittent time of a pilot signal is constant.

A relationship between an intermittent time of a pilot signal and a synchronization accuracy will be described below with reference to FIGS. 11 and 12. FIG. 11 shows the received power presented when the intermittent time of the pilot signal is not constant. FIG. 12 shows the received power presented when the intermittent time of the pilot signal is constant.

In order to maintain a synchronization, during a period between the time when the terminal finishes to receive a pilot signal and the time when the terminal receives the next pilot signal, the terminal should use an internal clock. The above-mentioned period is determined by a maximum time $\Delta t$ in the intermittent time of the pilot signal. Thus, the maximum time $\Delta t$ should be shorter than the time during which the terminal can maintain the synchronization by the internal clock. However, when an interval in which the terminal receives the pilot signal is not constant, it is frequently observed that a synchronization characteristic is deteriorated. Therefore, the interval of the beam should always preferably be constant as shown in FIG. 12.

A method of avoiding an interference of pilot signals between the cells will be described next.

Figure 13:
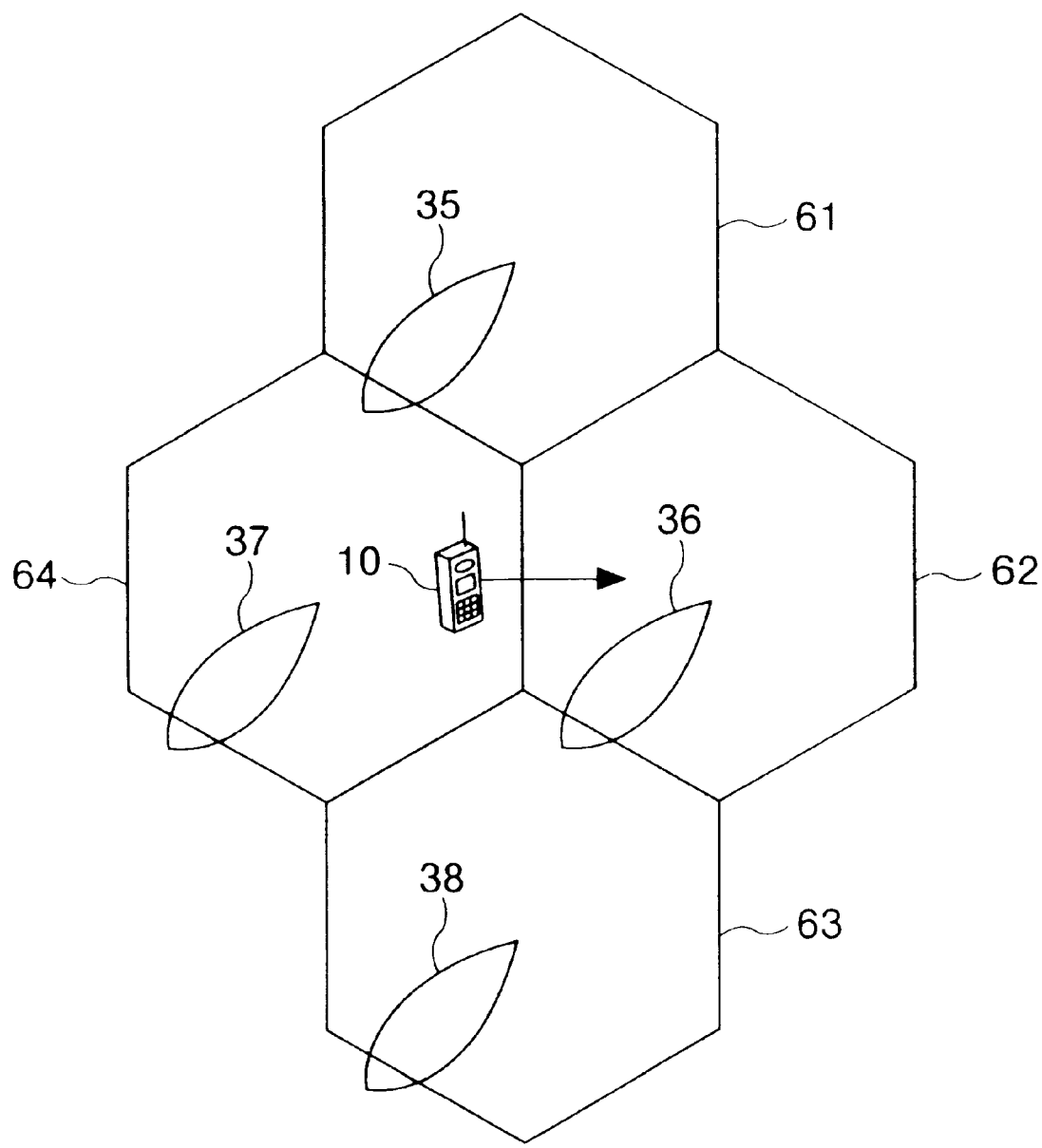
FIG. 13 is a diagram showing the manner in which transmission angles of pilot signals are synchronized with each other between the adjacent cells.

FIG. 13 is a diagram showing a radio communication system comprising a plurality of cells. In FIG. 13, reference numerals 35 to 38 denote beams of the pilot signals spread by the short spreading codes in which the long spreading codes are masked.

It is very difficult to determine a specific base station from which a pilot signal for establishing a synchronization is transmitted, in particular, at the boundary portion of the cells. Alternatively, it is also very difficult to discriminate a pilot signal from multipath caused by a strong reflecting material or the like. As a consequence, there occurs a trouble in establishing an initial synchronization such as when the terminal is energized.

Therefore, if the beams 35 to 38 with the pilot signals for synchronization in which the long spreading codes are masked are oriented in the same direction among a plurality of cells as shown in FIG. 13, then an interference becomes difficult to occur, and hence it becomes possible to prevent the terminal located at the boundary area from simultaneously receiving a plurality of pilot signals in which the long spreading codes are masked. As a method of synchronizing the angles of the pilot signals among a plurality of cells, there are known the following methods:

(A) Each base station has a GPS (Global Positioning System) to synchronize an angle of a pilot signal to a GPS clock;

(B) Each base station obtains initial synchronization from a clock of network; and (C) A plurality of base stations are ranked and a low-order base station receives and judges a signal from a highest-order base station on the basis of a phase, whereafter the low-order base station automatically corrects the angle of the pilot signal in such a manner that the pilot signal in which the long spreading code is masked is oriented in the opposite direction of the direction from which the base station receives the pilot signal.

So long as the pilot signals in which the spreading codes are masked are not simultaneously received by the terminal located at the boundary area, other methods may be used with similar action and effects being achieved although the angles of the pilot signals are deviated a little.

A method of reducing an influence exerted by the pilot signal from the adjacent cell will be described next. In FIG. 13, a signal received by the terminal 10 located at the boundary of a cell 64 is considerably affected by a pilot signal which is transmitted from a base station of other cell 62. Accordingly, a power has to be controlled at a timing in which the terminal 10 receives a pilot signal from the adjacent cell 62.

The terminal generally includes more than two receivers to constantly effect the cell-search during a communication. The terminal 10 memorizes therein a time difference between a reception time of a pilot signal of a close cell which will cause a largest interference at that time and a reception time of a pilot signal from a base station with which the terminal 10 is now communicated, and then reports the reception times and the time difference through the traffic channel to the base station with which the terminal 10 is now being communicated. In the CDMA system, since a signal quality is most deteriorated at the timing in which an interference becomes largest, if the base station previously obtains a timing at which a pilot signal arrives from other cell, then the power of a traffic channel can be controlled more efficiently.

Another method will be described with reference to FIG. 14.

Figure 14:
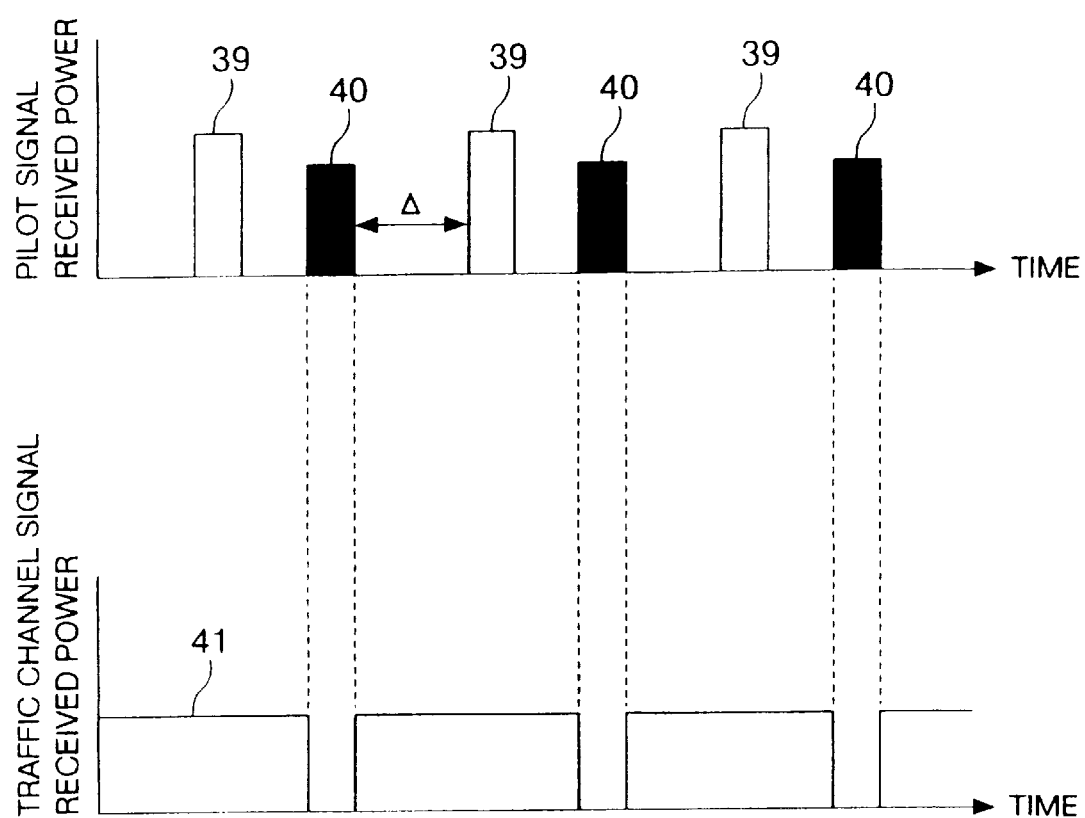
FIG. 14 is a diagram used to explain the manner in which a plurality of pilot signals received at a terminal in a boundary area and traffic channel information are transmitted intermittently.

In FIG. 14, reference numeral 39 denotes an terminal received power of a pilot signal from a base station with which the terminal is now being communicated. On the other hand, reference numeral 40 denotes a terminal received electric power of a pilot signal from the adjacent base station which causes the largest interference. The terminal reports a phase difference Δ between the electric powers 39 and 40 to the base station with which the terminal is now being communicated. Based on the reported result, the base station, which is now being communicated with the terminal, interrupts the transmission of the traffic channel information. Thus, although a data rate is decreased a little, there can be achieved the effects such that an influence of an interference can be reduced and that a communication capacity can be increased.

The radio communication system according to the present invention has been described so far, highlighting mainly the pilot signal. Incidentally, although beams may be rotated at the individual rotation speeds with respect to the call connection information, the broadcast information and the paging information as earlier noted, the present invention is not limited thereto, and the beams may be rotated at the same revolutions with respect to the call connection information, the broadcast information and the paging information. At that time, if the call connection information, the broadcast information and the paging information are respectively transmitted by different beams, then the number of control channel information transmitted to the same beam can be decreased, and hence an interference to the cell can be reduced much more.

III. Modified Examples

Modified examples according to the present invention will be described below.

The radio communication system according to the present invention has been described so far, highlighting mainly the CDMA system. However, an interference between the beams is not related to a particular multiple access system, and other multiple access systems such as TDMA (time division multiple access) system and FDMA (frequency division multiple access) system impose similar problems. Further, the present invention may be applied to systems of other CDMA system than the above-mentioned TIA/EIA/IS-95-A.

Recently, there is proposed a base station of a floating sector type using an array antenna. This base station of the floating sector type may be understood as a multi-sector base station having a directional antenna in which an antenna pattern is partly overlapped. In such system, an interference characteristic, in particular, is deteriorated in the portion in which the directivity is overlapped. The present invention may effectively be applied to such floating sector type system.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A cellular radio communication system comprising a plurality of base stations and a plurality of terminals and in which one cell is divided into a plurality of sectors, wherein each of said plurality of base stations transmits and receives control information by a directional beam with a time difference of the same information in a plurality of sectors within one cell and transmits and receives traffic information by a directional beam, wherein said directional beam for said control information is transmitted in such a manner that it is rotated when said base station is seen from above, and wherein channels are multiplexed by a CDMA system, wherein said CDMA system shall be in accordance with the TIA/EIA/IS-95-A and said control information are a pilot signal, call connection information, broadcast information and paging information, and wherein a plurality of base stations which are located close to each other transmit pilot signals with a synchronization of transmission angles of said pilot signals, wherein said plurality of base stations which are located close to each other are ranked according to signal phase order, each said base station receives the adjacent pilot signal of higher order signal phase and transmits a pilot signal in the direction opposite to the direction from which said pilot signal is received, thereby synchronizing transmission angles of pilot signals of a plurality of base stations.

2. A cellular radio communication system comprising a plurality of base stations and a plurality of terminals and in which one cell is divided into a plurality of sectors, wherein each of said plurality of base stations transmits and receives control information by a directional beam with a time difference of the same information in a plurality of sectors within one cell and transmits and receives traffic information by a directional beam, wherein said directional beam for said control information is transmitted in such a manner that it is rotated when said base station is seen from above, and wherein channels are multiplexed by a CDMA system, wherein said CDMA system shall be in accordance with the TIA/EIA/IS-95-A and said control information are a pilot signal, call connection information, broadcast information and paging information, and wherein a plurality of base stations which are located close to each other transmit pilot signals with a synchronization of transmission angles of said pilot signals, wherein each terminal includes more than two receivers, searches cells of other base station than a present communicated base station, memorizes and reports an arrival time and a cycle of a pilot signal from other base station than said presently communicated base station to said presently communicated base station and said presently communicated base station controls a transmit power in accordance with said arrival time and said cycle of said pilot signal.

3. A cellular radio communication system comprising a plurality of base stations and a plurality of terminals and in which one cell is divided into a plurality of sectors, wherein each of said plurality of base stations transmits and receives control information by a directional beam with a time difference of the same information in a plurality of sectors within one cell and transmits and receives traffic information by a directional beam, wherein said directional beam for said control information is transmitted in such a manner that it is rotated when said base station is seen from above, and wherein channels are multiplexed by a CDMA system, wherein said CDMA system shall be in accordance with the TIA/EIA/IS-95-A and said control information are a pilot signal, call connection information, broadcast information and paging information, and wherein a plurality of base stations which are located close to each other transmit pilot signals with a synchronization of transmission angles of said pilot signals, wherein each terminal includes more than two receivers, searches cells of other base station than a presently communicated base station, memorizes and reports a phase difference between a pilot signal of said presently communicated base station and a pilot signal of said base station other than said presently communicated base station to said presently communicated base station, and said presently communicated base station does not transmit traffic information during a time corresponding to said phase difference.

* * * * *